United States Patent
Wang et al.

(10) Patent No.: US 12,553,527 B2
(45) Date of Patent: Feb. 17, 2026

(54) METHOD FOR MANUFACTURING CONTROL VALVE, AND CONTROL VALVE AND VALVE BODY ASSEMBLY

(71) Applicant: ZHEJIANG SANHUA AUTOMOTIVE COMPONENTS CO., LTD., Zhejiang (CN)

(72) Inventors: Lixin Wang, Zhejiang (CN); Yun Wang, Zhejiang (CN); Long Lin, Zhejiang (CN); Jianhua Chi, Zhejiang (CN); Haijun Zhu, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 124 days.

(21) Appl. No.: 18/039,515

(22) PCT Filed: Jan. 17, 2022

(86) PCT No.: PCT/CN2022/072274
§ 371 (c)(1),
(2) Date: May 31, 2023

(87) PCT Pub. No.: WO2022/152288
PCT Pub. Date: Jul. 21, 2022

(65) Prior Publication Data
US 2024/0003443 A1 Jan. 4, 2024

(30) Foreign Application Priority Data

Jan. 18, 2021 (CN) .......................... 202110062316.3
Mar. 23, 2021 (CN) .......................... 202110306822.2

(51) Int. Cl.
*F16K 11/085* (2006.01)
*F16K 27/06* (2006.01)

(52) U.S. Cl.
CPC ........ *F16K 11/0853* (2013.01); *F16K 27/065* (2013.01)

(58) Field of Classification Search
CPC .......................... F16K 27/065; F16K 11/0853
See application file for complete search history.

(56) References Cited

U.S. PATENT DOCUMENTS 4,235,257 A * 11/1980 Wolf .................. B60H 1/00485
251/328
2010/0319796 A1 12/2010 Whitaker
(Continued)

FOREIGN PATENT DOCUMENTS

| CN | 108953652 A | 12/2018 |
| CN | 111434957 A | 7/2020 |

(Continued)

OTHER PUBLICATIONS

DE3246622A1 Machine Translation (Year: 1984).*
(Continued)

*Primary Examiner* — Michael R Reid
(74) *Attorney, Agent, or Firm* — Yue (Robert) Xu; Apex Attorneys at Law, LLP (57) ABSTRACT

A method for manufacturing a control valve, and a control valve and a valve body assembly. The method for manufacturing a control valve comprises: injection-molding a housing, fixedly connecting a sealing assembly to the housing, and mounting a valve core assembly. The housing comprises an annular side wall, and the housing has a first communication port. The sealing assembly is fixed to an inner surface of the annular side wall, the sealing assembly comprises a second communication port that corresponds to the first communication port and is in mutual communication with same, and the sealing assembly is fixedly connected to the inner surface of the annular side wall and forms a first sealing face on the periphery of the first communication (Continued)

port. The valve core assembly is inserted into a space formed by the sealing assembly, and is tightly fitted with an inner surface of the sealing assembly.

10 Claims, 9 Drawing Sheets

(56) References Cited

U.S. PATENT DOCUMENTS

| | | | | |
|---|---|---|---|---|
| 2014/0131228 | A1* | 5/2014 | Navar | C04B 26/32 |
| | | | | 156/60 |
| 2015/0316156 | A1* | 11/2015 | Nagahama | F16K 5/0471 |
| | | | | 137/625.46 |
| 2018/0292016 | A1* | 10/2018 | Ledvora | F16K 5/0471 |
| 2020/0256472 | A1 | 8/2020 | Henker | |
| 2020/0256475 | A1 | 8/2020 | Henker et al. | |

FOREIGN PATENT DOCUMENTS

| | | |
|---|---|---|
| CN | 111434958 A | 7/2020 |
| DE | 3246622 A1 | 7/1984 |
| GB | 1388422 A | 3/1975 |
| JP | H0594572 U | 12/1993 |
| JP | H08254272 A | 10/1996 |
| JP | 2011007328 A | 1/2011 |
| JP | 2016075382 A | 5/2016 |
| JP | 2017044266 A | 3/2017 |
| NO | 132109 | 6/1975 |

OTHER PUBLICATIONS

International Search Report for PCT/CN2022/072274 mailed Apr. 1, 2022, ISA/CN.
First Office Action dated Feb. 27, 2024 for Japanese patent application No. 2023-543199, English translation provided by Global Dossier.
European Search Report issued on Nov. 13, 2024 for the European counterpart application No. 22739163.8.

* cited by examiner

METHOD FOR MANUFACTURING CONTROL VALVE, AND CONTROL VALVE AND VALVE BODY ASSEMBLY

This application is the national phase of international patent application No. PCT/CN2022/072274, titled "METHOD FOR MANUFACTURING CONTROL VALVE, AND CONTROL VALVE AND VALVE BODY ASSEMBLY", filed on Jan. 17, 2022 which claims the benefit of priorities to the following two Chinese patent applications, all of which are incorporated herein by reference,
1) Chinese Patent Application No. 202110062316.3, titled "METHOD FOR MANUFACTURING CONTROL VALVE AND CONTROL VALVE", filed with the China National Intellectual Property Administration on Jan. 18, 2021; and
2) Chinese Patent Application No. 202110306822.2, titled "METHOD FOR MANUFACTURING CONTROL VALVE AND CONTROL VALVE", filed with the China National Intellectual Property Administration on Mar. 23, 2021.

FIELD

The present application relates to the technical of fluid control, and in particular to a method for manufacturing a control valve, a control valve and a valve body assembly.

BACKGROUND

In the conventional technology, multi-way control valves for controlling flow paths are used in, for example, a motor vehicle. At present, multiple control valves may be used to control the flow paths. A multi-way control valve includes a valve body, a valve core assembly and a sealing member. The sealing member is located between the valve core assembly and the valve body. In order to achieve sealing, the valve core assembly is required to press the sealing member, so that the sealing member is tightly fitted to the valve body and the valve core assembly. At this time, the compression amount of the sealing member is large, which is likely to increase the load of the valve core assembly during operation and further shorten the service life of the control valve.

SUMMARY

An object according to the present application is to provide a method for manufacturing a control valve, a control valve and a valve body assembly, where the control valve has excellent sealing performance, the load of a valve core assembly during operation is reduced, and the service life of the control valve is prolonged.

In one aspect, a method for manufacturing a control valve is provided according to an embodiment of the present application, which includes:
  forming a housing, wherein the housing includes an annular side wall, the housing is provided with an accommodating cavity, the housing is provided with a first communication port, and the first communication port extends through the annular side wall and is in communication with the accommodating cavity;
  fixedly connecting a sealing assembly to the housing, wherein the sealing assembly is fixed to an inner surface of the annular side wall, the sealing assembly includes a second communication port, the second communication port corresponds to and is in communication with the first communication port after the sealing assembly and the housing are fixedly connected to form an integral structure, and the sealing assembly is sealingly connected to the inner surface of the annular side wall; and assembling a valve core assembly, wherein the valve core assembly is inserted into a space formed by the sealing assembly, and is tightly fitted and sealed to an inner surface of the sealing assembly.

In another aspect, a control valve is further provided according to an embodiment of the present application, which includes a valve body assembly and a valve core assembly. The valve body assembly includes a housing and a sealing assembly. The housing includes an annular side wall. The housing is provided with an accommodating cavity. The housing is provided with a first communication port. The first communication port extends through the annular side wall and is in communication with the accommodating cavity. The sealing assembly is located on an inner surface of the annular side wall. The sealing assembly includes a second communication port. The first communication port corresponds to and is in communication with the second communication port. The sealing assembly is fixedly connected and sealed to the inner surface of the annular side wall. At least part of the valve core assembly is located in a space formed by the sealing assembly, and is tightly fitted and sealed to an inner surface of the sealing assembly.

In another aspect, a valve body assembly is further provided according to an embodiment of the present application, which includes a housing and a sealing assembly. The housing includes an annular side wall. The housing is provided with an accommodating cavity. The housing is provided with a first communication port. The first communication port extends through the annular side wall and is in communication with the accommodating cavity. The sealing assembly is located on an inner surface of the annular side wall. The sealing assembly includes a second communication port. The first communication port corresponds to and is in communication with the second communication port. The sealing assembly is fixedly connected and sealed to the inner surface of the annular side wall.

In the method for manufacturing the control valve, the control valve and the valve body assembly according to the embodiments of the present application, the sealing assembly and the inner surface of the annular side wall of the housing are fixedly connected to form the integral structure, so that the sealing assembly can be connected to the annular side wall of the housing to form the integral structure in a non-detachable manner, which can achieve the excellent sealing performance between the sealing assembly and the annular side wall. In the case that the sealing assembly and the annular side wall of the housing are separately arranged, a large compression amount is required between the valve core assembly and the sealing assembly to achieve the sealing performance between the sealing assembly and the housing and the sealing performance between the sealing assembly and the valve core assembly. In the method for manufacturing the control valve according to the embodiments of the present application, the integral structure of the sealing assembly and the annular side wall of the housing has excellent sealing performance, which can save the compression amount of the sealing assembly for achieving the sealing performance between the sealing assembly and the housing. Therefore, the compression amount between the valve core assembly and the sealing assembly is reduced. In addition, when the valve core assembly rotates relative to the housing, the rotating torque of the valve core assembly can be effectively reduced. Therefore, the heat generation and wear between the valve core assembly and the sealing assembly are reduced, and the service life of the control valve is prolonged.

DETAILED DESCRIPTION OF THE EMBODIMENTS

The features and exemplary embodiments of various aspects of the present application are described in detail below. To make the objects, technical solutions and advantages of the present application clearer, the present application is further described in detail in conjunction with the drawings and specific embodiments.

In the field of control valves for fluid control, a control valve includes a valve body, a valve core assembly, and a sealing member located between the valve body and the valve core assembly. The valve body is provided with an accommodating cavity. At least part of the valve core assembly is located in the accommodating cavity. The valve core assembly is rotatable, driven by a drive device. The sealing member is configured to seal a connection between the valve core assembly and the valve body, so as to prevent the working medium from leaking when the working medium passes through the connection between the valve core assembly and the valve body during the operation of the valve core assembly.

A method for manufacturing a control valve and a control valve are provided according to embodiments of the present application. The method for manufacturing the control valve and the control valve according to embodiments of the present application are described below in combination with the accompanying drawings.

Figure 1:
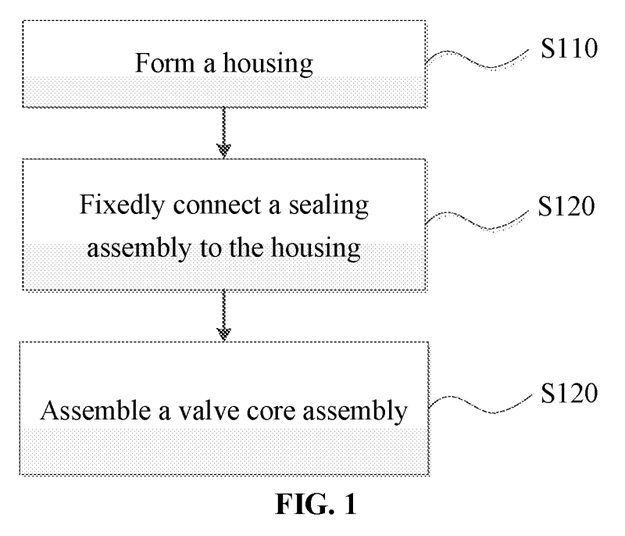
FIG. 1 is a flowchart of a method for manufacturing a control valve according to an embodiment of the present application.
Figure 2:
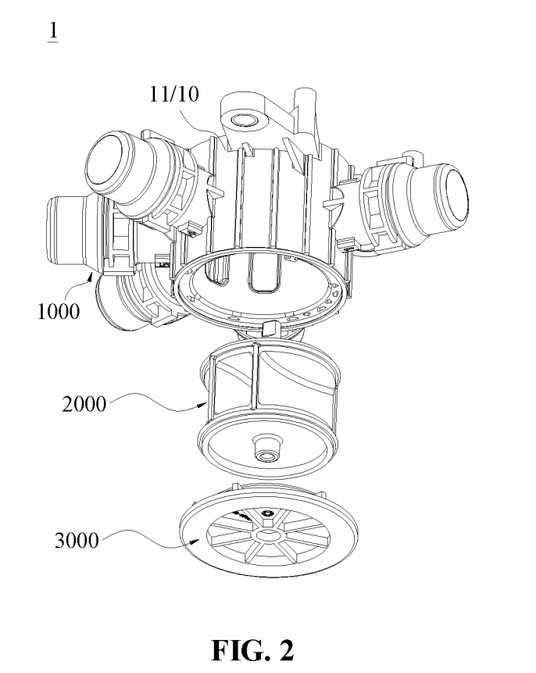
FIG. 2 is a schematic exploded view of the control valve according to an embodiment of the present application.
Figures 3, 4:
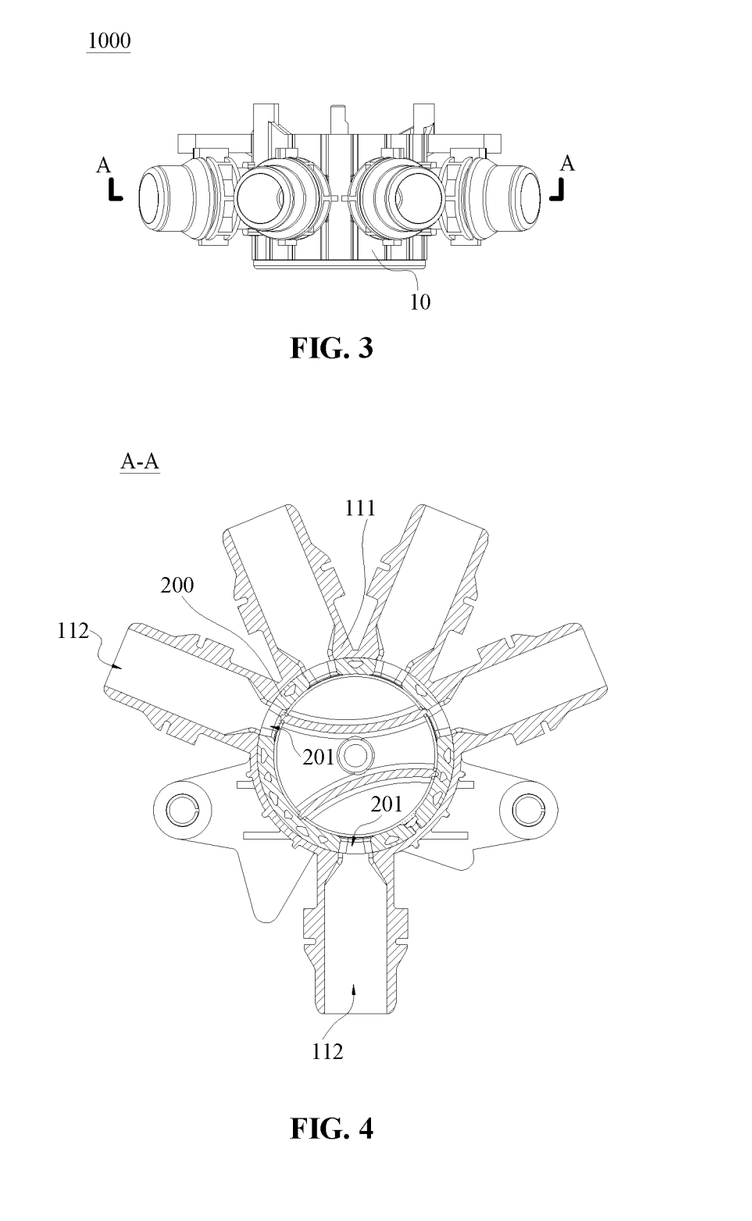
FIG. 3 is a schematic structural view of a valve body assembly according to an embodiment of the present application viewed from a first perspective.
FIG. 4 is a schematic cross-sectional view of the valve body assembly shown in FIG. 3 taken along line A-A.

Referring to FIG. 1 to FIG. 4, FIG. 1 is a flowchart of a method for manufacturing a control valve according to an embodiment of the present application, FIG. 2 is a schematic exploded view of the control valve according to an embodiment of the present application, FIG. 3 is a schematic structural view of a valve body assembly according to an embodiment of the present application viewed from a first perspective, and FIG. 4 is a schematic cross-sectional view of the valve body assembly shown in FIG. 3 taken along line A-A.

A method for manufacturing the control valve is provided according to an embodiment of the present application, which includes the following.

S110, forming a housing 10.

The housing 10 is formed by injection molding. The housing 10 includes an annular side wall 11 and a bottom wall. The housing 10 is provided with an accommodating cavity, and the accommodating cavity is defined by the annular side wall 11 and the bottom wall. The housing 10 further includes a first sub-portion 111. The annular side wall 11 is connected to the first sub-portion 111. The housing 10 is provided with a first communication port 112 which extends through the first sub-portion 111 and the annular side wall 11 and is in communication with the accommodating cavity. The first sub-portion 111 may have a tubular structure. By defining the first communication port 112 in the housing 10, the fluid controlled by the control valve 1 can flow through the first communication port 112. The annular side wall 11 is a side wall defining the accommodating cavity. The annular side wall 11 includes an inner contour and an outer contour. An inner surface of the annular side wall 11 forms the inner contour, and an outer surface of the annular side wall 11 forms the outer contour. The shapes of the inner contour and the outer contour may be the same or different. For example, in FIG. 2, a main body of the inner contour of the annular side wall 11 is a cylindrical surface, and the outer surface of the annular side wall 11 can be set according to the requirements of users. For example, the outer surface of the annular side wall 11 includes a mounting flat surface, so as to facilitate the mounting of the control valve 1. Alternatively, as shown in FIG. 2, a main body of the outer surface of the annular side wall 11 is also a cylindrical surface, which is not limited herein.

S120, fixedly connecting a sealing assembly 200 to the housing 10 to form an integral structure.

Figure 5:
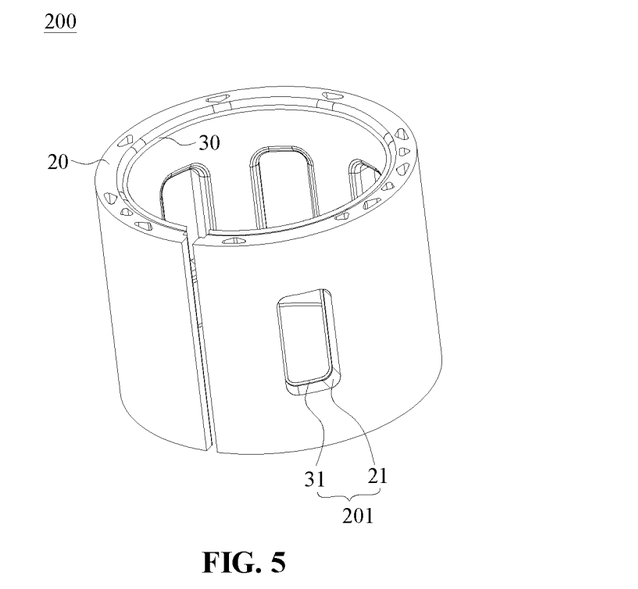
FIG. 5 is a schematic structural view of a sealing assembly according to an embodiment of the present application.

In the embodiments of the present application, the sealing assembly 200 is fixed to the inner surface of the annular side wall 11. In an embodiment, the sealing assembly 200 may have an arc-shaped structure after assembly. In order to reserve a larger expansion space for the sealing assembly 200 and reduce the manufacturing and design difficulty of the sealing assembly 200, as shown in FIG. 3 to FIG. 5, the sealing assembly 200 assembled into the accommodating cavity may have an unclosed arc-shaped structure, that is, an orthographic projection of the sealing assembly 200 assembled into the accommodating cavity has an arc-shaped surface on the bottom wall. In order to achieve the fluid communication function of the control valve, the sealing assembly 200 further includes a second communication port 201. After the sealing assembly 200 is fixedly connected to the housing 10 to form the integral structure, the second communication port 201 corresponds to and is in communication with the first communication port 112. The sealing assembly 200 is sealingly connected to the inner surface of the annular side wall 11. In an embodiment, the sealing assembly 200 is fixedly connected and sealed to the inner surface of the annular side wall 11. The sealing assembly 200 and the inner surface of the annular side wall 11 form a first sealing surface at an outer periphery of the first communication port 112, where the first sealing surface is a contact surface between the sealing assembly 200 and the annular side wall 11. In an embodiment, the housing 10 is provided with multiple first communication ports 112, the sealing assembly 200 is also provided with multiple second communication ports 201 with the same number as the first communication ports 112. The multiple first communication ports 112 are in one-to-one correspondence with the multiple second communication ports 201, where the respective first communication port 112 and the corresponding second communication port 201 are in communication with each other. The sealing assembly 200 is fixedly connected to the housing 10, which refers to that the sealing assembly 200 is fixed to the housing 10 in a non-detachable manner to form an integral structure.

S130, assembling a valve core assembly 2000.

Specifically, the valve core assembly 2000 is inserted into a space formed by the sealing assembly 200. The valve core assembly 2000 is tightly fitted and sealingly connected to an inner surface of the sealing assembly 200. The valve core assembly 2000 and the inner surface of the sealing assembly 200 are tightly fitted to form a second sealing surface. The second sealing surface is a contact surface between the valve core assembly 2000 and the sealing assembly 200. In the embodiments of the present application, the valve core assembly 2000 is inserted into the space formed by the inner surface of the sealing assembly 200. The sealing assembly 200 is located between the valve core assembly 2000 and the annular side wall 11. A predetermined compression amount is reserved between the valve core assembly 2000 and the sealing assembly 200, so that an excellent seal is formed between an outer surface of the valve core assembly 2000 and the inner surface of the sealing assembly 200.

In the method for manufacturing the control valve according to the embodiments of the present application, the sealing assembly 200 and the inner surface of the annular side wall 11 of the housing 10 are fixedly connected to form the integral structure, so that the sealing assembly 200 can be connected to the annular side wall 11 of the housing 10 to form the integral structure in a non-detachable manner, which can achieve the excellent sealing performance between the sealing assembly 200 and the annular side wall 11. In the case that the sealing assembly and the annular side wall of the housing are separately arranged, a large compression amount is required between the valve core assembly and the sealing assembly to achieve an excellent sealing performance of the control valve, wherein the sealing performance includes the sealing between the sealing assembly and the housing and the sealing between the sealing assembly and the valve core assembly. In the method for manufacturing the control valve according to the embodiments of the present application, the integral structure of the sealing assembly 200 and the annular side wall 11 of the housing 10 has an excellent sealing performance, which can save the compression amount of the sealing assembly 200 for achieving the sealing performance between the sealing assembly 200 and the housing 10. Therefore, the compression amount between the valve core assembly 2000 and the sealing assembly 200 is reduced, the rotating torque of the valve core assembly 2000 is reduced, and the service life of the control valve 1 is prolonged.

Referring to FIG. 5 to FIG. 8, since the valve core assembly 2000 is rotatable, and there is friction between the valve core assembly 2000 and the sealing assembly 200 during rotation, in some embodiments, the sealing assembly 200 has a composite structure to improve the strength of the sealing assembly 200. The sealing assembly 200 includes an elastic member and a sealing member 30, where the elastic member 20 is sleeved on an outer surface of the sealing member 30. The shapes of the elastic member 20 and the sealing member 30 are matched with each other. For example, the elastic member 20 and the sealing member 30 each have an arc-shaped structure with a predetermined arc length. The elastic member 20 is located between the sealing member 30 and the annular side wall 11. The elastic member 20 has a predetermined elastic effect. For example, the elastic member 20 may be made of rubber. The sealing member 30 has a large strength. For example, the sealing member 30 may be made of plastic. The composite structure of the sealing assembly 200 can improve the strength of the sealing assembly 200 while ensuring the sealing performance. In other embodiments, the sealing assembly 200 may be one single part. The sealing assembly 200 is fixedly connected to the annular side wall 11 of the housing 10 to form the integral structure, and forms a dynamic sealing structure together with the valve core assembly 2000.

In some embodiments, in a case that the sealing assembly 200 has a composite structure, the second communication port 201 of the sealing assembly 200 includes a first sub-opening 21 and a second sub-opening 31 which are in communication with each other. The first sub-opening 21 is located on the sealing member 20 and extends through the elastic member 20 along a thickness direction of the elastic member 20. The second sub-opening 31 is located on the sealing member 30 and extends through the sealing member 30 along a thickness direction of the sealing member 30. The first communication port 112, the first sub-opening 21 and the second sub-opening 31 correspond to and are in communication with one another, so that the working medium can flow between the first communication port 112, the first sub-opening 21 and the second sub-opening 31. In an embodiment, the sealing member 30 may be made of Teflon. The sealing member 30 not only plays a sealing role, but also has a certain lubricating performance, which can reduce the friction between the valve core assembly 2000 and the sealing assembly 200. Therefore, the driving force of the control valve 1 can be relatively smaller.

In the case that the sealing assembly 200 and the housing 10 are fixedly connected to form the integral structure, in order to effectively improve the sealing performance between the sealing assembly 200 and the annular side wall 11 of the housing 10, in some embodiments, the sealing assembly 200 is fixedly connected to the annular side wall 11 of the housing 10 by the elastic member 20 to form a first sealing surface on an outer periphery of the first sub-opening 21. The first sealing surface is located between the elastic member 20 and the annular side wall 11, and is configured to achieve the sealing between the elastic member 20 and the annular side wall 11. The elastic member 20 is fixedly connected and sealed to the sealing member 30. The elastic member 20 and the sealing member 30 form a third sealing surface on an outer periphery of the second sub-opening 31, where the third sealing surface is a contact surface between the elastic member 20 and the sealing member 30. By fixedly connecting the sealing assembly 200 and the housing 10 to form the integral structure, a uniform integral structure and a sealing surface are formed between the elastic member 20 and the annular side wall 11 of the housing 10. Compared with the case that the sealing assembly 200 and the housing 10 are separately arranged, a large compression amount of the sealing assembly 200 is required to ensure the static sealing between the annular side wall 11 and the sealing assembly 200 and the dynamic sealing between the sealing assembly 200 and the valve core assembly 2000. In the embodiments of the present application, the elastic member 20 and the housing 10 are fixedly connected to form an integral structure, which has an excellent sealing performance, can effectively prevent the internal leakage of the flowing working medium, and can reduce the working load of the valve core assembly 2000.

In order to achieve a stable union of the sealing assembly 200 and the annular side wall 11 of the housing 10, in an embodiment, the elastic member 20 and the housing 10 are fixedly connected to form an integral structure without a gap, and the elastic member 20 and the sealing member 30 are fixedly connected to form an integral structure without a gap. In some embodiments, the elastic member 20 may be made of a vulcanizable material. For example, the elastic member 20 may be made of rubber. In this case, the step S120 of fixedly connecting a sealing assembly 200 to the housing 10 includes: step S1200, fixedly connecting the elastic member 20 to the annular side wall 11 to form an integral structure by vulcanization. Through the above arrangement, the uniform integral structure and the sealing surface are formed between the elastic member 20 and the annular side wall 11 of the housing 10.

Figure 9:
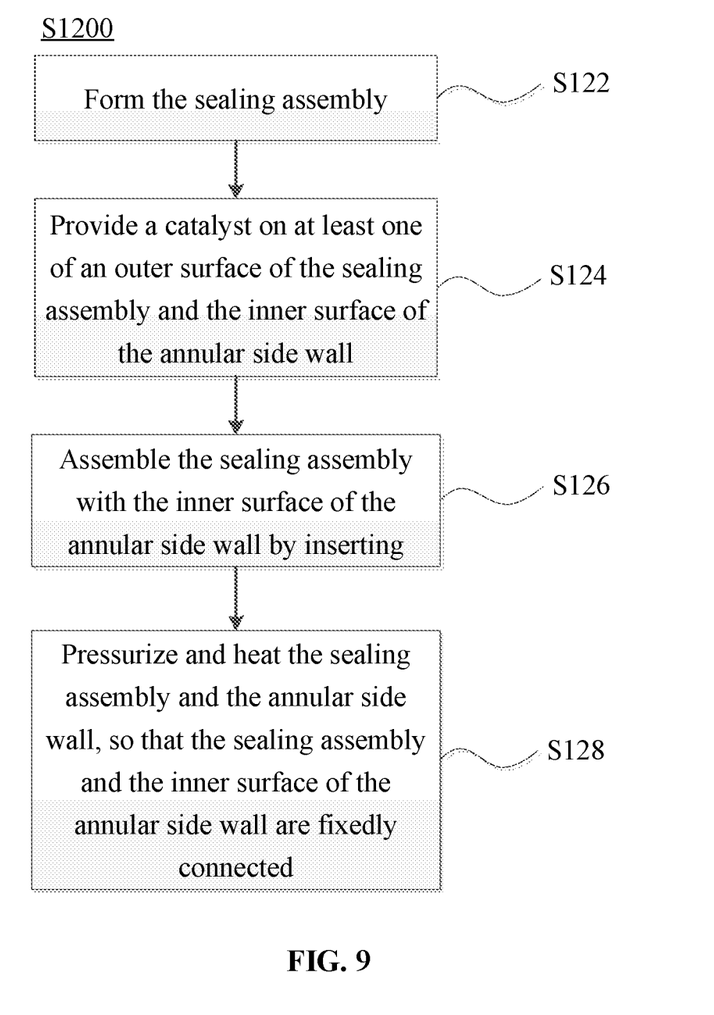
FIG. 9 is a flowchart of step 1200 according to an embodiment of the present application.

On this basis, referring to FIG. 9, FIG. 9 is a flowchart of step 1200 according to an embodiment of the present application. In some embodiments, the step S1200 of fixedly connecting the elastic member 20 to the annular side wall 11 by vulcanization includes:

step S122, forming the sealing assembly 200;
wherein the sealing assembly 200 in the embodiments of the present application includes the elastic member 20 and the sealing member 30, and the elastic member 20 and the sealing member 30 are fixedly connected to form an integral structure;
step S124, providing a catalyst on at least one of an outer surface of the sealing assembly 200 and the inner surface of the annular side wall 11;
step S126, assembling the sealing assembly 200 with the inner surface of the annular side wall 11 by inserting; and
step S128, pressurizing and heating the sealing assembly 200 and the annular side wall 11, so that the sealing assembly 200 and the inner surface of the annular side wall 11 are fixedly connected to form an integral structure.

Through the above arrangement, the sealing assembly 200 can be fixedly connected to the annular side wall 11 by the elastic member 20 and the first sealing surface is formed between the elastic member 20 and the annular side wall 11, so as to achieve the fixed connection between the sealing assembly 200 and the annular side wall 11 and achieve the compact sealing performance.

In the specific implementation, the housing 10 of the control valve 1 may be firstly formed in a mold by injection-molding, and the sealing assembly 200 may be formed, wherein the elastic member 20 is fixed to the sealing member 30 of the sealing assembly 200 to form an integral structure. In an embodiment, the elastic member 20 is fixedly connected to the sealing member 30 by vulcanization, and the chemical molecules of the elastic member 20 and the chemical molecules of the sealing member 30 are tightly united. After the housing 10 and the sealing assembly 200 are formed, the catalyst is coated on an inner surface of the housing 10, or the catalyst is coated on the outer surface of the elastic member 20 of the sealing assembly 200, or the catalyst is coated on both the inner surface of the housing 10 and the outer surface of the elastic member 20 of the sealing assembly 200, so as to facilitate the connection between the housing 10 and the sealing assembly 200. Then, the housing 10 and the sealing assembly 200 which are coated with the catalyst are placed in an environment with a predetermined pressure and temperature, and the housing 10 and the sealing assembly 200 are pressurized and heated for a predetermined time, so that the elastic member 20 is fixedly formed on the inner surface of the annular side wall 11, and material molecules in the elastic member 20 form stable connection with material molecules in the annular side wall 11 by chemical bonds, and there is no gap between the elastic member 20 and the inner surface of the annular side wall 11 or the gap is smaller than a particle size of the working medium, thereby achieving compact sealing performance. The pressure and temperature for pressurizing and heating the housing 10 and the sealing assembly 200 can be set according to the material of the housing 10, the material of the elastic member 20 and the material of the sealing member 30, which is not limited herein.

Figure 10:
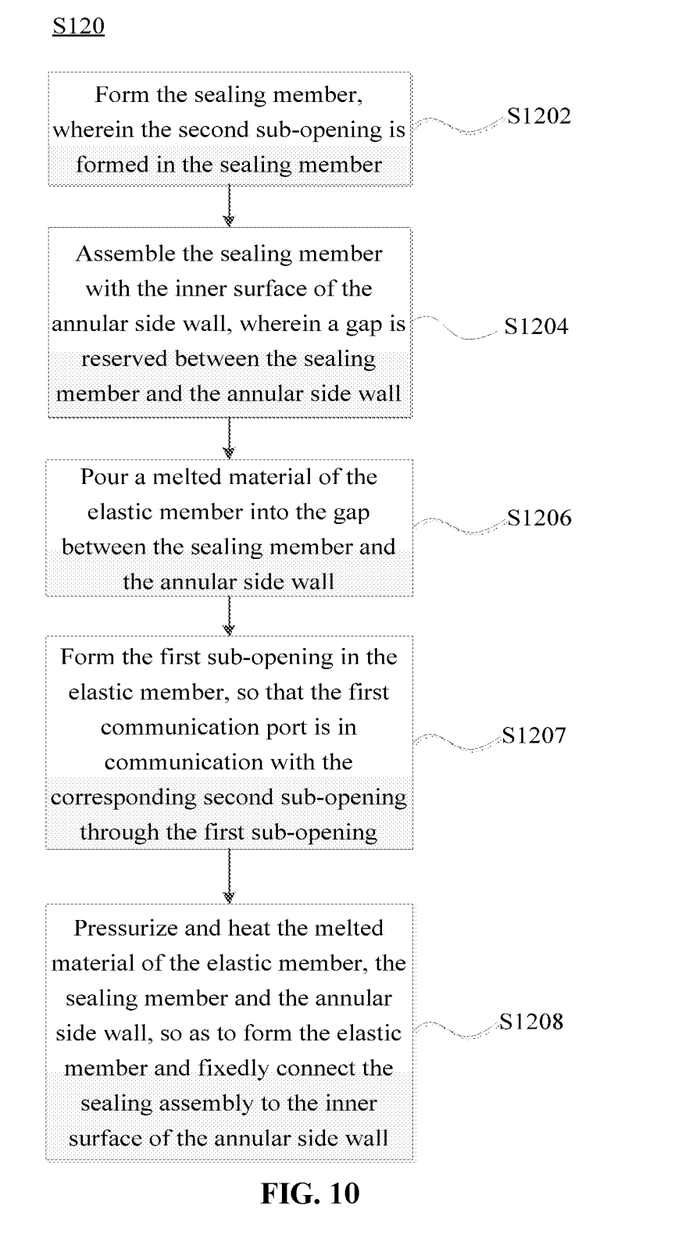
FIG. 10 is a flowchart of step 120 according to another embodiment of the present application.
Figure 11:
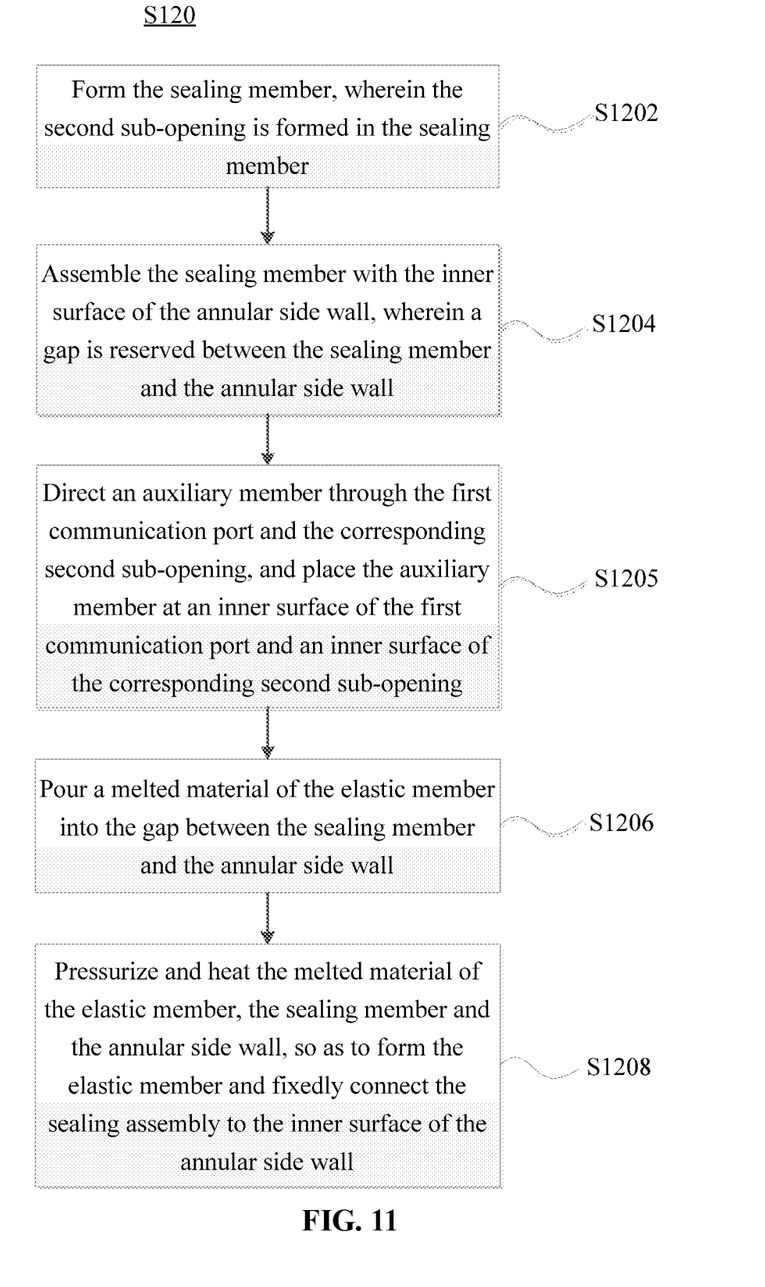
FIG. 11 is a flowchart of step 120 according to another embodiment of the present application.

Referring to FIG. 10 and FIG. 11, FIG. 10 is a flowchart of step 120 according to another embodiment of the present application, and FIG. 11 is a flowchart of step 120 according to yet another embodiment of the present application. Since the sealing assembly 200 includes the elastic member 20 and the sealing member 30, in some embodiments, the step S120 of fixedly connecting the sealing assembly 200 to the housing 10 includes the following steps to stably connect the sealing assembly 200 to the annular side wall 11 of the housing 10:

step S1202, forming the sealing member 30, wherein the second sub-opening 31 is formed in the sealing member 30;
step S1204, assembling the sealing member 30 with the inner surface of the annular side wall 11, wherein a gap is reserved between the sealing member 30 and the annular side wall 11;
step S1206, pouring a melted material of the elastic member into the gap between the sealing member 30 and the annular side wall 11; and
step S1208, pressurizing and heating the melted material of the elastic member, the sealing member 30 and the annular side wall 11, so as to form the elastic member 20 and fixedly connect the sealing assembly 200 to the inner surface of the annular side wall 11 to form an integral structure.

In the specific implementation, the formed sealing member 30 can be arranged to be surrounded by the inner surface of the annular side wall 11, and the position of the first communication port 112 can correspond to the position of the corresponding second sub-opening 31. In this step, radial positions of the annular side wall 11 and the sealing member 30 can be limited by limiting members respectively, so as to ensure the size of the gap between the sealing member 30 and the annular side wall 11. Then, the melted material of the elastic member is poured into the gap between the sealing member 30 and the annular side wall 11, so that the melted material of the elastic member is filled between the sealing member 30 and the annular side wall 11. Finally, the melted material of the elastic member, the sealing member 30 and the annular side wall 11 are pressurized and heated, so that the melted material of the elastic member solidifies to form the elastic member 20 and the sealing assembly 200 is fixedly formed on the inner surface of the annular side wall 11. At this time, the elastic member 20 is connected to the housing 10 and the sealing member 30 by chemical bonding, so as to achieve excellent sealing performance between the elastic member 20 and the housing 10 and excellent sealing performance between the elastic member 20 and the sealing member 30.

Referring to FIG. 10, since the control valve 1 needs to conduct the flowing working medium, in some embodiments, after the step S1206 of pouring a melted material of the elastic member into the gap between the sealing member 30 and the annular side wall 11, the method according to the embodiments of the present application further includes:

step S1207, forming the first sub-opening 21 in the elastic member 20, so that the first communication port 112 is in communication with the corresponding second sub-opening 31 through the first sub-opening 21. Through the above arrangement, the working medium can stably flow between the first communication port 112, the first sub-opening 21 and the second sub-opening 31, so as to achieve the control of the fluid by the control valve 1.

Figure 12:
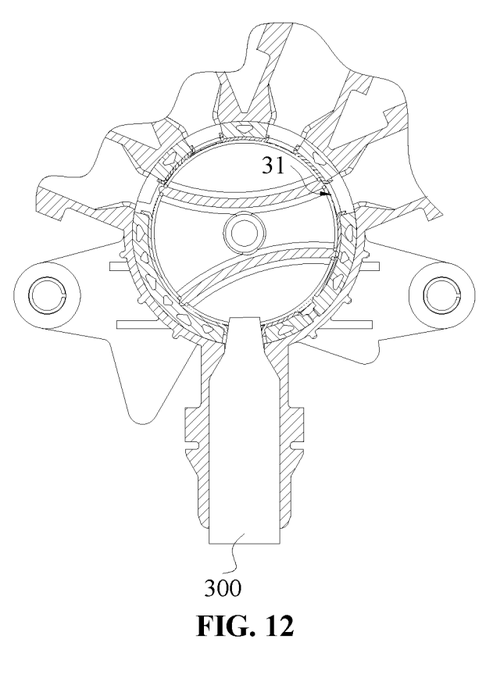
FIG. 12 is a schematic structural view corresponding to step S1205 shown in FIG. 11.

Referring to FIG. 11 and FIG. 12, FIG. 12 is a flowchart of step 120 according to yet another embodiment of the present application. In order to form the first sub-opening 21 in the elastic member 20 to communicate the first communication port 112 with the first sub-opening 21, in some embodiments, before the step S1206 of pouring a melted material of the elastic member into the gap between the sealing member 30 and the annular side wall 11, the method further includes:

step S1205, directing an auxiliary member 300 through the first communication port 112 and the corresponding second sub-opening 31, and placing the auxiliary member 30 at an inner surface of the first communication port 112 and an inner surface of the corresponding second sub-opening 31.

Figure 6:
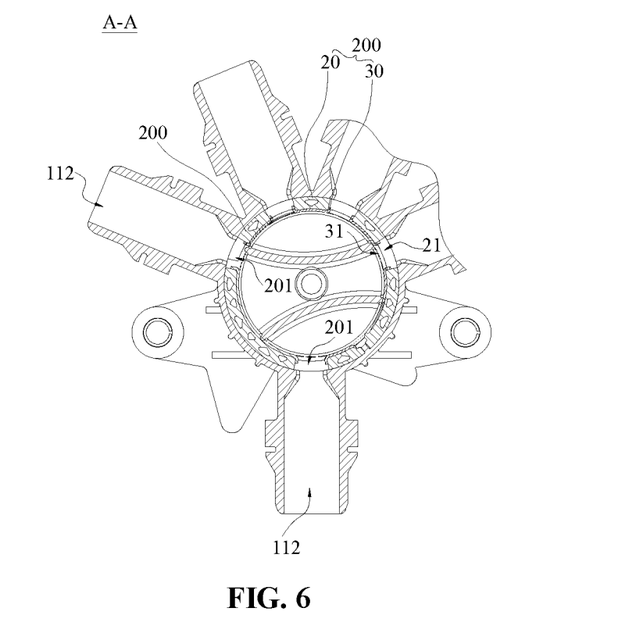
FIG. 6 is a schematic cross-sectional view of another valve body assembly shown in FIG. 3 taken along line A-A.
Figure 7:
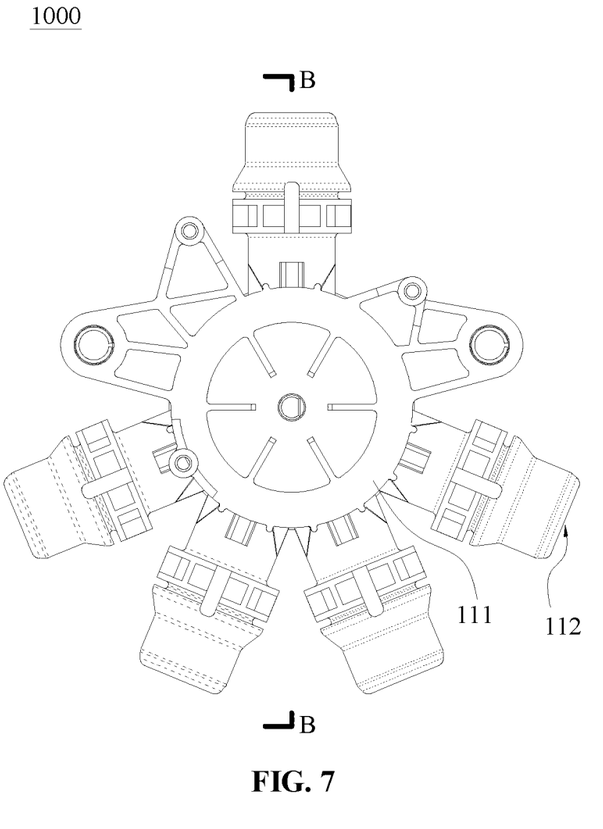
FIG. 7 is schematic structural view of the valve body assembly according to an embodiment of the present application viewed from a second perspective.
Figure 8:
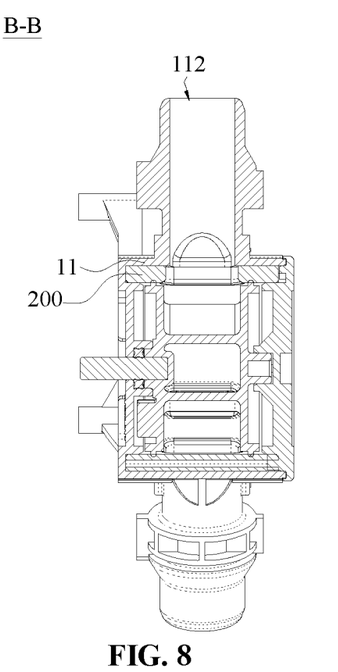
FIG. 8 is a schematic cross-sectional view of the valve body assembly shown in FIG. 7 taken along line B-B.

As shown in FIG. 6 and FIG. 12, FIG. 12 only schematically shows an assembly relationship of the auxiliary member 300, the first communication port 112 of the annular side wall 11, and the second sub-opening 31 of the sealing member 30. In the specific implementation, the auxiliary member 300 can be extended into the first communication port 112 and the second sub-opening 31, be sealingly connected to the annular side wall 11 at the first communication port 112, and be sealingly connected to the sealing member 30 at the second sub-opening 31. Part of the auxiliary member 300 is located in the gap between the annular side wall 11 and the sealing member 30, and an outer contour of the auxiliary member 300 fills a gap between the first communication port 112 and the second sub-opening 31. Through the above arrangement, the auxiliary member 300 can prevent the melted material of the elastic member from flowing to the positions corresponding to the first communication port 112 and the second sub-opening 31. After the melted material of the elastic member is pressurized and heated for a predetermined time, the auxiliary member 300 is withdrawn to form the elastic member 20 with the first sub-opening 21.

In summary, in the method for manufacturing the control valve according to the embodiments of the present application, the sealing assembly 200 and the inner surface of the annular side wall 11 of the housing 10 are fixedly connected to form the integral structure, so that the sealing assembly 200 can be connected to the annular side wall 11 of the housing 10 to form the integral structure in a non-detachable manner, which can achieve the excellent sealing performance between the sealing assembly 200 and the annular side wall 11, and can reduce the compression amount between the valve core assembly 2000 and the sealing assembly 200. When the valve core assembly 2000 rotates relative to the housing 10, the rotating torque of the valve core assembly 2000 can be effectively reduced. Therefore, the heat generation and wear between the valve core assembly 2000 and the sealing member 30 are reduced, and the service life of the control valve 1 is prolonged.

In another aspect, a control valve 1 is further provided according to an embodiment of the present application, and the control valve is manufactured by the method for manufacturing the control valve according to any one of the above embodiments. In the control valve 1 according to the embodiments of the present application, the sealing assembly 200 is fixedly formed on the inner surface of the annular side wall 11 of the housing 10, so that the sealing assembly 200 can be connected to the annular side wall 11 of the housing 10 to form the integral structure, which can achieve the excellent sealing performance between the sealing assembly 200 and the annular side wall 11, and can reduce the compression amount between the valve core assembly 2000 and the sealing member 30. Therefore, the wear between the valve core assembly 2000 and the sealing member 30 is reduced, and the service life of the control valve 1 is prolonged.

The control valve 1 according to the embodiments of the present application can be applied to a heat exchange system, such as an automotive air conditioning system or a household air conditioning system. Specifically, the working medium flowing through the control valve 1 may be water, a mixture of water and other liquids or other cooling liquids with thermal conductivity. The control valve 1 controls the distribution of the working medium and regulates and distributes the outlet flow of the control valve 1, thus controlling the working medium of the flow path of the heat exchange system. Therefore, the control performance of the flow path of the heat exchange system is improved and optimized.

In another aspect, a valve body assembly 1000 is further provided according to an embodiment of the present application, which is used in the above control valve 1. At least part of the valve core assembly 2000 of the control valve 1 is fitted in the valve body assembly 1000. The valve core assembly 2000 is rotatable, driven by a transmission mechanism. The valve body assembly 1000 includes a housing 10 and a sealing assembly 200 which are fixedly connected. The housing 10 includes an annular side wall 11 and a first sub-portion 111. The housing 10 is provided with an accommodating cavity. The annular side wall 11 is fixedly connected to the first sub-portion 111. The first sub-portion 111 includes a first communication port 112. The first communication port 112 extends through the first sub-portion 111 and the annular side wall 11, and is in communication with the accommodating cavity. The sealing assembly 200 is located on an inner surface of the annular side wall 11. The valve core assembly 2000 is located in a space formed by the sealing assembly 200. The sealing assembly 200 further includes a second communication port 201 which corresponds to and is in communication with the first communication port 112. The sealing assembly 200 is fixedly connected and sealed to the inner surface of the annular side wall 11, and forms a first sealing surface at an outer periphery of the first communication port 112. Through the above arrangement, the excellent sealing performance between the sealing assembly 200 and the annular side wall 11 can be achieved, and the compression amount between the valve core assembly 2000 and the sealing member 30 can be reduced. Therefore, the wear between the valve core assembly 2000 and the sealing member 30 is reduced, and the service life of the control valve 1 is prolonged. In addition, the valve body assembly 1000 according to the embodiments of the present application can be produced or sold separately, which can simplify the structure of the control valve 1 and reduce the assembly steps. Therefore, it is convenient to popularize and utilize the valve body assembly.

In some embodiments, the sealing assembly 200 includes an elastic member 20 and a sealing member 30, where the elastic member 20 is sleeved outside the sealing member 30. The structure of the elastic member 20 and the structure of the sealing member 30 are similar to the structures of the elastic member 20 and the sealing member 30 according to any one of the above embodiments, which is not described in detail herein. The valve body assembly according to the embodiments of the present application can be produced or sold separately, which can effectively improve the sealing performance of the valve body assembly and the sealing performance between the valve body assembly and the valve core assembly. Therefore, it is convenient to popularize and utilize the valve body assembly.

In another aspect, a control valve 1 is further provided according to an embodiment of the present application, which includes a valve body assembly 1000 and a valve core assembly 2000. The valve body assembly 1000 is the valve body assembly according to any one of the above embodiments. At least part of the valve core assembly 2000 is located in an accommodating cavity formed by the valve body assembly 1000. The valve body assembly 1000 includes a housing 10 and a sealing assembly 200. The housing 10 includes an annular side wall 11 and a first sub-portion 111 which are fixedly connected. The housing 10 is provided with an accommodating cavity. The housing 10 is provided with a first communication port 112. The first communication port 112 extends through the first sub-portion 111 and the annular side wall 11, and is in communication with the accommodating cavity. The sealing assembly 200 is located on an inner surface of the annular side wall 11. The sealing assembly 200 includes a second communication port 201 which corresponds to and is in communication with the first communication port 112. The sealing assembly 200 is fixedly connected to the inner surface of the annular side wall 11, and forms a first sealing surface at an outer periphery of the first communication port 112. At least part of the valve core assembly 2000 is located in a space formed by the sealing assembly 200, and is tightly fitted and sealed to an inner surface of the sealing assembly 200 to form a second sealing surface. Through the above arrangement, the excellent sealing performance between the sealing assembly 200 and the annular side wall 11 can be achieved, and the compression amount between the valve core assembly 2000 and the sealing member 30 can be reduced. Therefore, the wear between the valve core assembly 2000 and the sealing member 30 is reduced, and the service life of the control valve 1 is prolonged. The above arrangement can simplify the structure of the control valve 1 and reduce the assembly steps. Therefore, it is convenient to popularize and utilize the control valve. Alternatively, the sealing assembly 200 may be the sealing assembly 200 according to any one of the above embodiments, which is not described in detail herein.

In some embodiments, the sealing assembly 200 is fixedly connected to the annular side wall 11 by vulcanization. Through the above arrangement, the sealing assembly 200 and the annular side wall 11 are fixedly connected to form an integral structure, and there is no gap between the sealing assembly 200 and the annular side wall 11. The control valve 1 according to the embodiments of the present application can achieve the excellent sealing performance between the sealing assembly 200 and the annular side wall 11, and can reduce the compression amount between the valve core assembly 2000 and the sealing member 30. When the valve core assembly 2000 rotates relative to the housing 10, the rotating torque of the valve core assembly 2000 can be effectively reduced. Therefore, the heat generation and wear between the valve core assembly 2000 and the sealing member 30 are reduced, and the service life of the control valve 1 is prolonged. Therefore, it is convenient to popularize and utilize the control valve.

It should be understood that, relational terms herein such as "first" and "second" are merely used to distinguish one entity or operation from another entity or operation, and does not necessarily require or imply that there is an actual relation or sequence between these entities or operations. It should be understood that the terms used in this way can be interchanged in appropriate cases, so that the embodiments in the present application described herein, for example, can be operated or be arranged in an order different from those described herein or in other ways. It should be noted that, the above embodiments are only intended to illustrate the present application and not to limit the technical solutions described in the present application. Although the present specification has been described in detail with reference to the embodiments described above, it should be understood by those skilled in the art that, modifications or equivalent substitutions can still be made by those skilled in the art to the technical solutions of the present application without departing from the spirit and scope of the present application, all of which should be covered within the scope of the claims of the present application.

The invention claimed is:

1. A method for manufacturing a valve body assembly of a control valve, comprising:
   forming a housing, wherein the housing comprises an annular side wall, the housing is provided with an accommodating cavity, the housing is provided with a first communication port, and the first communication port extends through the annular side wall and is in communication with the accommodating cavity; and
   fixedly connecting a sealing assembly to the housing, wherein the sealing assembly is fixed to an inner surface of the annular side wall, the sealing assembly comprises a second communication port, the second communication port corresponds to and is in communication with the first communication port after the sealing assembly and the housing are fixedly connected to form an integral structure, and the sealing assembly is sealingly connected to the inner surface of the annular side wall;
   wherein the sealing assembly comprises an elastic member and a sealing member; the elastic member is located between the sealing member and the annular side wall;
   wherein the second communication port comprises a first sub-opening and a second sub-opening, wherein the first sub-opening extends through the elastic member along a thickness direction of the elastic member; the second sub-opening extends through the sealing member along a thickness direction of the sealing member,
   wherein the fixedly connecting the sealing assembly to the housing comprises:
   forming the sealing member, wherein the second sub-opening is formed in the sealing member;
   assembling the sealing member with the inner surface of the annular side wall, wherein a gap is reserved between the sealing member and the annular side wall;
   pouring a melted material of the elastic member into the gap between the sealing member and the annular side wall; and pressurizing and heating the melted material of the elastic member, the sealing member and the annular side wall, so as to form the elastic member and fixedly connect the sealing assembly to the inner surface of the annular side wall to form an integral structure.

2. The method for manufacturing the valve body assembly of the control valve according to claim 1, wherein the fixedly connecting a sealing assembly to the housing comprises:

fixedly connecting and sealing the elastic member to the annular side wall, and fixedly connecting and sealing the elastic member to the sealing member.

3. The method for manufacturing the valve body assembly of the control valve according to claim 2, wherein after pouring a melted material of the elastic member into the gap between the sealing member and the annular side wall, the method further comprises:

forming the first sub-opening in the elastic member, so that the first communication port is in communication with the corresponding second sub-opening through the first sub-opening.

4. The method for manufacturing the valve body assembly of the control valve according to claim 2, wherein before pouring a melted material of the elastic member into the gap between the sealing member and the annular side wall, the method further comprises:

directing an auxiliary member through the first communication port and the corresponding second sub-opening, and placing the auxiliary member at an inner surface of the first communication port and an inner surface of the corresponding second sub-opening, wherein an outer contour of the auxiliary member fills a gap between the first communication port and the second sub-opening.

5. A valve body assembly, manufactured by using the method according to claim 2.

6. The method for manufacturing the valve body assembly of the control valve according to claim 2, wherein the fixedly connecting the sealing assembly to the housing comprises:

fixedly connecting the elastic member to the sealing member by vulcanization.

7. A control valve, comprising the valve body assembly according to claim 5 and a valve core assembly, wherein at least part of the valve core assembly is located in a space formed by the sealing assembly, and is tightly fitted and sealed to an inner surface of the sealing assembly.

8. The control valve according to claim 7, wherein the sealing assembly is fixedly connected to the annular side wall by vulcanization.

9. The control valve according to claim 7, wherein the elastic member is fixedly connected and sealed to the annular side wall, and the elastic member is fixedly connected and sealed to the sealing member.

10. The control valve according to claim 8, wherein the elastic member is fixedly connected and sealed to the annular side wall, and the elastic member is fixedly connected and sealed to the sealing member.

* * * * *